United States Patent
Cecere

(10) Patent No.: US 6,565,899 B1
(45) Date of Patent: May 20, 2003

(54) COMBINATION LOLLIPOP, DRINKING STRAW AND BEVERAGE CAP

(76) Inventor: Al Louis Cecere, 511 Patterson La., Gatlinburg, TN (US) 37738

( * ) Notice: Subject to any disclaimer, the term of this patent is extended or adjusted under 35 U.S.C. 154(b) by 0 days.

(21) Appl. No.: 09/573,979

(22) Filed: May 19, 2000

(51) Int. Cl.[7] ............................ A23G 3/00; B65D 41/04
(52) U.S. Cl. ........................ 426/85; 426/134; 426/132
(58) Field of Search ................... 426/132, 115, 426/104, 134, 112, 85, 86

(56) References Cited

U.S. PATENT DOCUMENTS

| | | | | |
|---|---|---|---|---|
| 1,500,047 A | | 7/1924 | Bias | |
| 1,593,858 A | * | 7/1926 | Venable | 426/134 |
| 1,936,816 A | * | 11/1933 | Zitzman | 426/134 |
| 1,996,203 A | | 4/1935 | Hollingsworth | |
| 2,036,706 A | | 4/1936 | Law | |
| 2,975,925 A | | 3/1961 | Chambers | |
| 3,469,997 A | * | 9/1969 | Rossi et al. | 426/134 |
| 3,545,980 A | | 12/1970 | Stanger | |
| 3,717,476 A | * | 2/1973 | Harvey | 426/115 |
| 3,730,737 A | * | 5/1973 | Harvey | 426/115 |
| 3,740,239 A | * | 6/1973 | Chancellor | 426/115 |
| 4,229,482 A | | 10/1980 | Kreske, Jr. | |
| 4,239,175 A | * | 12/1980 | Straubinger | 426/515 |
| 4,976,364 A | * | 12/1990 | Solomon | |
| 5,085,330 A | * | 2/1992 | Paulin | 426/115 |
| 5,180,079 A | * | 1/1993 | Jeng | 426/115 |
| 5,234,117 A | * | 8/1993 | Garvin | |
| 5,324,527 A | * | 6/1994 | Coleman | 426/115 |
| 5,381,924 A | * | 1/1995 | Kiefel | |
| 5,509,551 A | * | 4/1996 | Terrell | |
| 5,753,284 A | | 5/1998 | Green et al. | |
| 5,809,935 A | * | 9/1998 | Kolterman | |
| 5,932,262 A | * | 8/1999 | Little | 426/115 |

FOREIGN PATENT DOCUMENTS

| | | | | |
|---|---|---|---|---|
| FR | 2698773 | * | 7/1992 | |
| WO | WO99/64323 | * | 12/1999 | 426/115 |

* cited by examiner

Primary Examiner—Steve Weinstein
(74) Attorney, Agent, or Firm—Welsh & Flaxman

(57) ABSTRACT

A novelty device formed of the combination of a drinking straw, beverage bottle cap and a lollipop type edible confection to be attached to a beverage bottle allowing the consumer to simultaneously enjoy and taste the flavors of the lollipop confection and a liquid beverage.

1 Claim, 3 Drawing Sheets

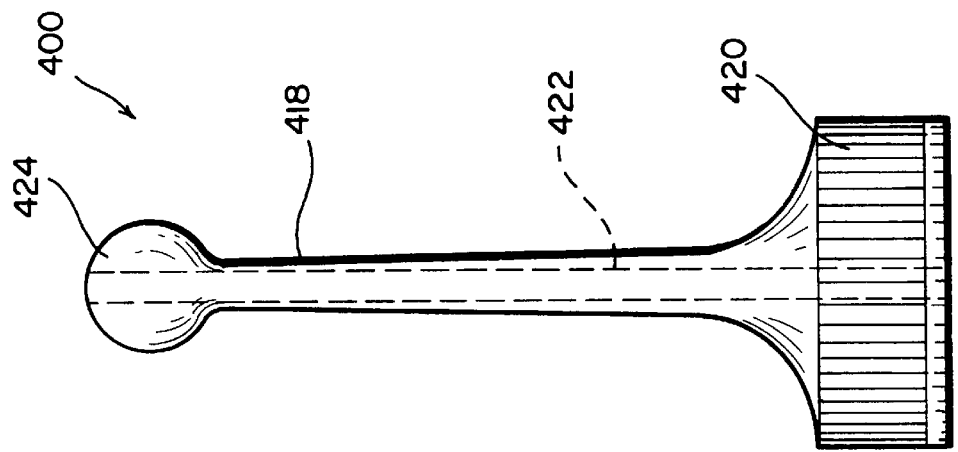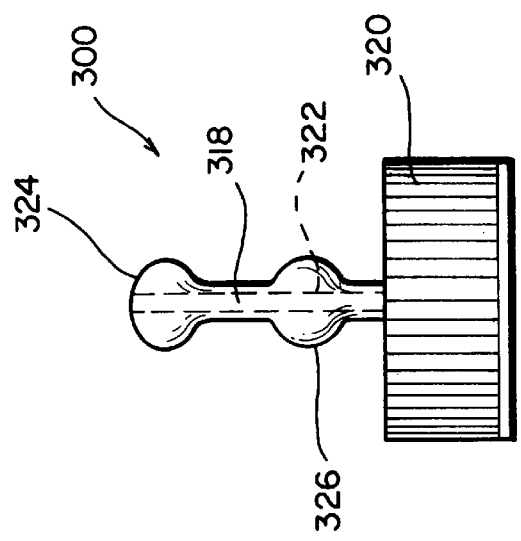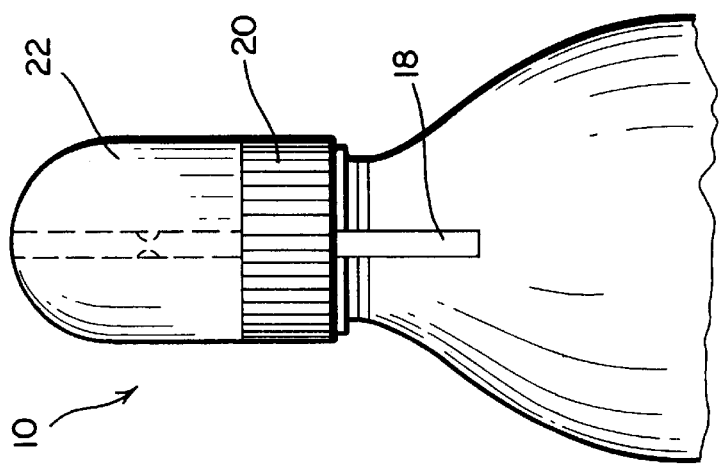

COMBINATION LOLLIPOP, DRINKING STRAW AND BEVERAGE CAP

BACKGROUND OF THE INVENTION

The present invention relates to novelties and confections and, in particular, to the combination of a beverage drinking straw, a beverage bottlecap and an edible hard candy confectionary in the form of a sucker or lollipop.

A variety of novelty items combine a straw with an additional flavoring material to further enhance the enjoyment of a consumer drinking a liquid. Some of the prior art devices which have been patented are listed below.

U.S. Pat. No. 3,545,980 to Stanger shows a combination straw and candy formed on one end of the straw so that the candy may be placed in a user's mouth and simultaneously the candy may function as a lollipop to enable the user to not only taste the candy but to sip the liquid material through the straw thereby enhancing the flavor combination.

U.S. Pat. No. 2,036,706 to Law discloses a frozen confection placed on a straw whereby the confection is lowered into a glass of beverage to cool or flavor the beverage while allowing a user to entrain the beverage through the straw to consume it.

U.S. Pat. No. 1,500,047 to Bias shows the combination of a toy balloon and a lollipop attached to one end thereof whereby the balloon may be blown up while consuming the lollipop.

U.S. Pat. No. 2,975,925 to Chambers shows a container attachment for pop bottles for holding flavoring mixtures or other edible materials so that the contents of the pop bottle are flavored as it passes through the container. The container includes oppositely disposed neck portions one of which is insertable into the top of a soda bottle and the other which is used as a straw to consume the flavored liquid.

U.S. Pat. No. 1,996,203 to Hollingsworth shows a drinking straw coated with a soluble flavoring material so that when the straw is used the material will flavor the liquid being drawn through the straw.

SUMMARY OF THE INVENTION

The present invention relates to a novelty in the form of the combination of a drinking straw, cap for a beverage and a lollipop type confection attached to a beverage bottle which allows the consumer to simultaneously enjoy and taste the flavors of an edible hard candy lollipop type sucker and a liquid beverage, such as, soda pop. The candy material dissolves in the consumer's mouth and mixes with liquid beverage flowing into the mouth to form a flavor combination that enhances both the candy lollipop and beverage flavors.

The device includes a tubular opening for entraining a liquid beverage from a container, preferably an elongated rigid plastic tubular straw, a candy sucker or lollipop molded or otherwise affixed around one end of the straw, and an integral bottle cap, preferably with internal threads suitable for screw attachment to a conventional threaded beverage bottle, such as a soda pop bottle or the like. The straw is conventional and includes a hollow tubular channel running the length of the straw and is open at both ends to allow the sipping of liquid beverage therethrough in a conventional way by placing a lower end of the straw in a liquid beverage container and the upper end in the user's mouth. The lollipop or sucker body is formed over one end of the drinking straw such that the straw extends through the center of the lollipop presenting an opening for liquid passing through the straw to a user. Preferably, an end portion of the straw also has an indentation, protuberence or other annular discontinuity which secures the lollipop body to the straw while it is being used. The top outer portion of the bottlecap is positioned against the bottom of the lollipop and the straw is inserted through a suitably sized hole in the center of the cap.

In use, the free end of the straw is inserted into a beverage bottle containing a suitable liquid and the bottlecap is screwed onto the threaded neck of the beverage bottle. Both the cap and the lollipop attached thereto are attached to the top of the beverage bottle with a straw extending therethrough.

With the lollipop in the users mouth and with a liquid beverage being drawn through the drinking straw, the user is able to taste, consume and enjoy a variety of different candy flavors in combination with different beverage flavors by simultaneously sipping through the straw and sucking on the lollipop. The combination of the lollipop, straw and the screw-on bottlecap closes the opening on the top of the beverage bottle, except for the straw opening, allowing the bottle to be held in a variety of positions without spilling the liquid contents.

When the device of the subject invention is used in conjunction with a beverage container that does not have a threaded bottleneck, for example, a drinking glass or the like, the combination can be used in the same manner as any drinking straw by putting the end into the beverage liquid and sipping from the straw with the candy lollipop body in the user's mouth. If the user desires to consume only the candy lollipop component, without drinking a liquid in conjunction therewith, then the rigid plastic tubular drinking straw can be held by the consumer's hand and used like a traditional lollipop stick. When used in this manner, the bottle cap may be reversed on the straw and used to catch any liquid dripping from the lollipop.

The non-candy portion of the device can be manufactured by assembling a separate cap and straw or molded together in a single piece. It will be appreciated the device can be made with a straw having various lengths. The device can be manufactured in a version for use only in conjunction with standard soda bottles that have threaded necks and totally eliminate the portion of the drinking straw that protrudes out of the bottom of the cap. The device can also be manufactured, packaged and marketed either in combination with a small or large beverage container filled with a liquid beverage or manufactured separately without a liquid beverage bottle or container attached thereto.

The lollipop body component of the device may be manufactured in a variety of flavors allowing the consumer to creatively combine these flavors with existing beverage flavors that are sold on the market. When the device is packaged and marketed without a beverage container, the consumer is given the opportunity to select a particular lollipop flavor and combine it with a particular liquid beverage flavor.

The lollipop component may be manufactured in a variety of colors and shapes in order to suit the interest of particular consumers. Similarly, the plastic straw can be manufactured in a variety of colors and/or shapes, as can the plastic bottle cap.

Therefore, it is a principal object of the present invention to provide a novel confection device suitable for use with beverage containers having consumable liquid therein for enhancement of the flavors thereof.

Another object of the present invention is the provision of the combination of a drinking straw, bottlecap and lollipop which may be used with a beverage container having a suitable consumable liquid to combine flavors of the beverage and the lollipop.

Still another object of the present invention is the provision of a novel confection, cap and straw combination which may be made in a wide variety of colors, shapes and flavors.

Still another object of the present invention is the provision of a novel lollipop, beverage bottle cap and straw combination which may be used in combination with a beverage container or consumed separately therefrom.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 shows an elevational view of a first embodiment of the present invention on a beverage bottle.

FIG. 10 shows a detail of another embodiment of the present invention.

FIG. 11 shows a detail of still another embodiment of the present invention.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
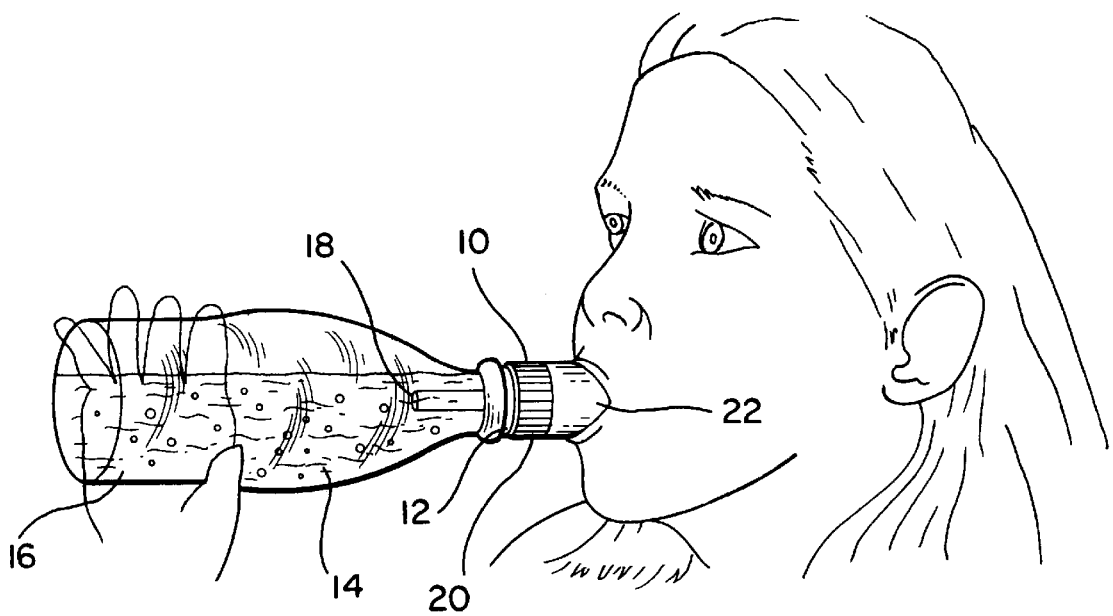
FIG. 1 is an illustrative view of a consumer using the present invention.
Figure 3:
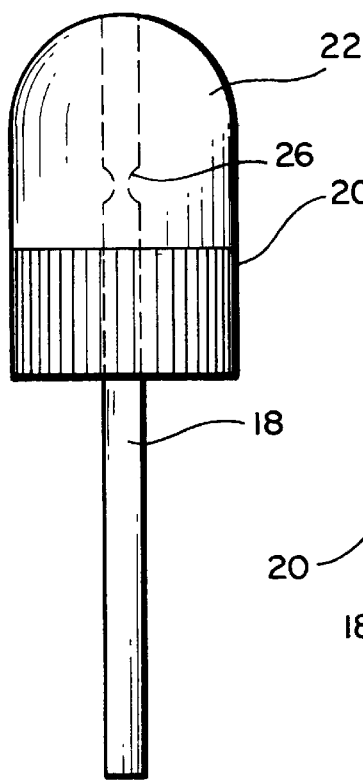
FIG. 3 shows an elevational view of the first embodiment of the present invention apart from a beverage bottle.
Figure 4:
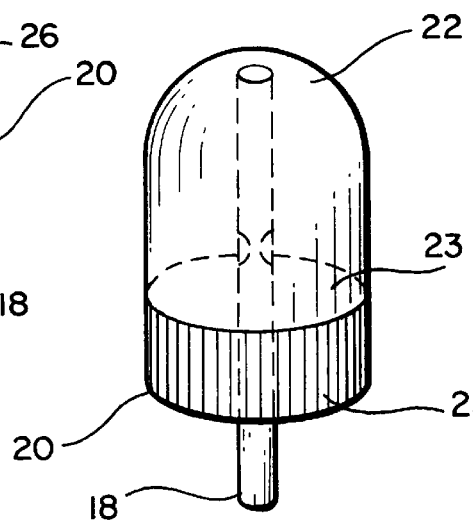
FIG. 4 shows a top perspective view of the embodiment of FIG. 2.
Figure 5:
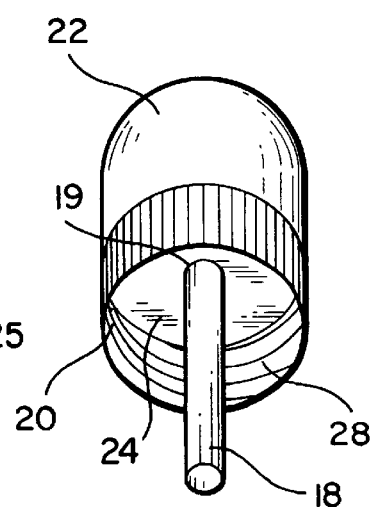
FIG. 5 shows a bottom perspective view of the embodiment of FIG. 2.

FIG. 1 shows a combination straw, cap and lollipop device 10 in accordance with the present invention. The device 10 is secured onto a conventional threaded top 12 of a beverage bottle 14. The bottle contains consumable liquid 16. The combination straw, cap and lollipop device 10 of the present invention includes a straw 18, a cap 20 and a lollipop 22.

Referring to the drawings, the straw 18 is conventional and is formed from various plastics with an elongated tubular opening to allow fluid transmission therethrough. The straw 18 further includes an annular recess 26 which provides a means to securely attach the lollipop 22 when it is molded or otherwise formed on the end of the straw during the lollipop making process. This ensures that the lollipop will not slide or otherwise be removed from the straw as the device is used by the consumer.

Figures 7, 8, 9:
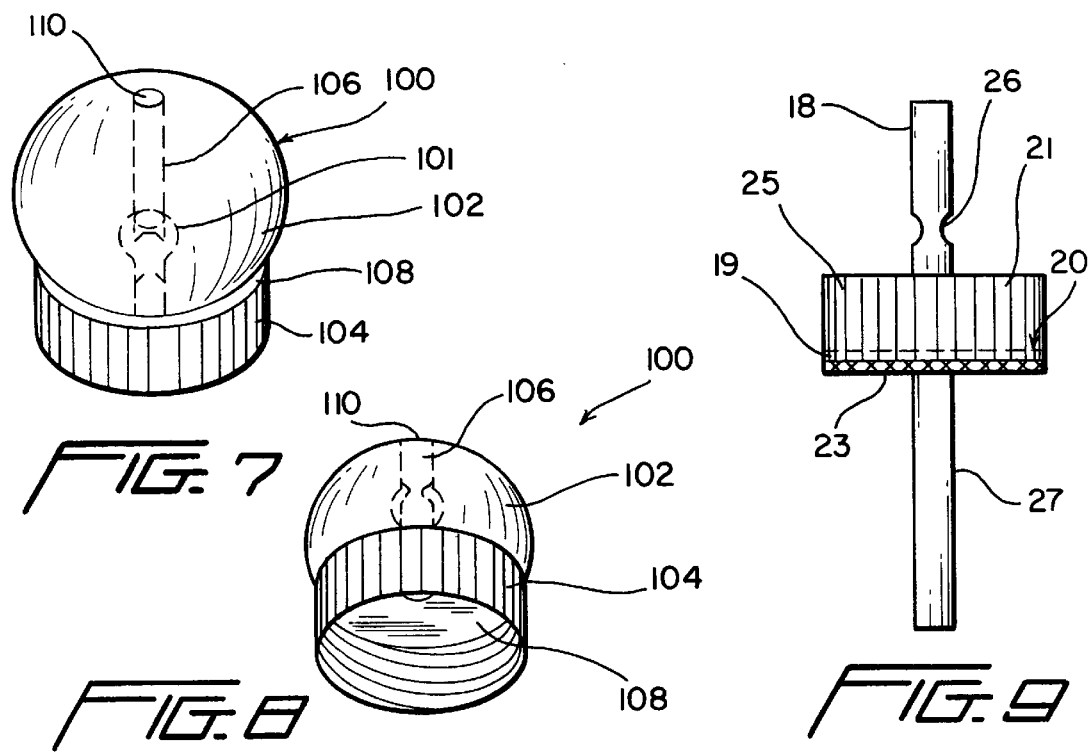
FIG. 7 is a top perspective view of third embodiment with the edible material attached to move with a straw flow closure.
FIG. 8 is a bottom perspective view thereof.
FIG. 9 shows a detail of the present invention with the bottle cap turned over.

The straw 18 is fit into an opening (not shown) through a resilient gasket 19 in the top wall 24 of the plastic cap 20. The straw 18 is secured thereto such that the cap 20 can be removed from the straw 18, inverted and then placed back on the straw in a different orientation, whereby a portion of the straw functions as a handle 27, as shown in FIG. 9. The cap 20 includes an upper surface 23 and an annular sleeve 25 extending downwardly therefrom. The sleeve 25 has internal threads 28 to facilitate connection to a standard threaded beverage bottle. The upper surface 23 provides support for an edible material 22. It will be appreciated that the straw 18 may be integrally formed with the cap 20 as a single molded piece. The lollipop 22 is formed over the portion of the straw 18 which extends beyond the top wall 24 of the cap 20 using conventional candy making techniques so that it lies on or above the cap top wall 24 and encloses the straw 18.

Figures 6A, 6B, 6C:
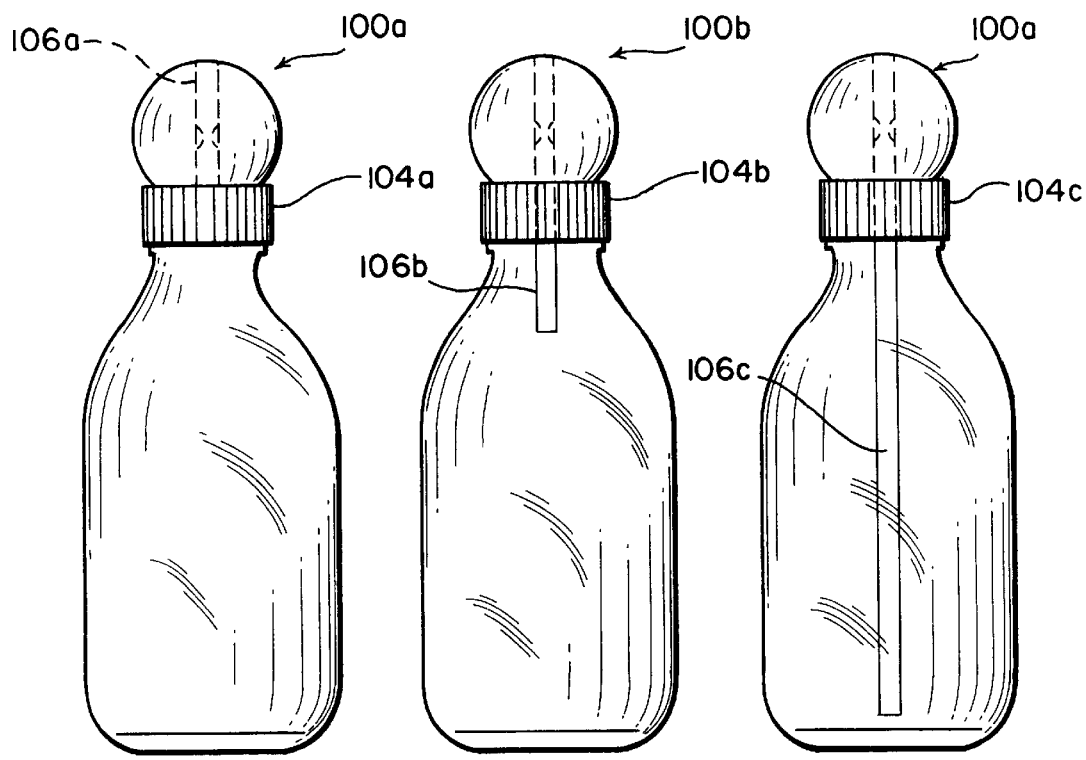
FIG. 6 shows three variations of a second embodiment of the device of the present invention connected to a standard beverage bottles.

FIGS. 6a–c illustrate three variations of a second embodiment of a straw, beverage bottle cap, and lollipop device 100a–c, respectively in accordance with the present invention. Each device 100a–c includes a lollipop 102a–c, cap 104a–c and straw 106a–c, respectively. In this embodiment the lollipop is round and the length of the straw may be varied.

FIG. 6a shows an embodiment 100a wherein the straw 106a terminates at or below the top of the cap 104a. FIG. 6b shows an embodiment 100b in which the straw 106b extends only part way into the beverage container bottle. FIG. 6c shows an embodiment 100c in which the straw 106c extends to the bottom of the beverage container.

FIGS. 7 and 8 show another embodiment wherein the edible material 102 is attached to a movable straw flow closure 101. The flow closure 101 functions in the conventional manner in that when it is raised flow is permitted out of straw 106 and when it is lowered into contact with the top of the bottle cap 104 flow is restricted. The bulbous form of the flow closure 101 functions to retain the edible material thereon. It will be appreciated that the tubular opening 110 in the straw 106 extends completely through the lollipop 102 whereby a consumer may place the lollipop 102 in his or her mouth and obtain access to liquid beverage materials within the beverage container. As shown in FIG. 7, the lollipop and flow closure are raised up off of the bottle cap 104 and thus flow is permitted through the straw 106 and in FIG. 8 flow is not permitted as the lollipop and flow closure are lowered into contact with the top of the cap 108.

FIG. 9 illustrates a straw 18 and cap 20 connected together prior to the formation of a lollipop. The straw 18 is provided with an annular waisted groove 26 which to ensure rigid connection between the lollipop (not shown) and the straw 18 when forming the lollipop. Further illustrated is a cap 20 with its open end 21 facing the end of the straw to which the lollipop is to be attached. In this embodiment, the cap functions to catch any candy drippings. The cap 20 can be removed and inverted and still retain the straw therein due to the friction fit created by gasket 19 shown in dotted lines.

FIG. 10 shows another embodiment of a straw and cap combination 300 for use with a lollipop (not shown). In this embodiment, the upper portion of the straw 318 extends through the cap 320 and includes two generally spherical protuberances 324 and 326 which serve to lock the lollipop on the straw 318 as well as eliminate any sharp edges at the end of the straw 318. The straw 318 is provided with an inner, tubular passageway 322 which allows fluid in a container to be drawn therethrough using mouth suction.

FIG. 11 illustrates another embodiment of a straw and cap combination 400 including an elongated straw 418 and cap 420. The combination 400 is formed as a single unit and is structured to hold a lollipop (not shown) on the top of the straw 418. The straw 418 is provided with an inner, tubular passageway 422 which allows fluid in a container to be drawn out using mouth suction. The top of the straw 418 is formed with a generally spherical protuberance 424 which eliminates sharp edges at the top of the straw 418 and also provides a rounded surface for locking attachment of a lollipop molded thereto. Thus, as the lollipop is consumed, it is not easily removed from the straw 418. It will be appreciated that the cap 420 and straw 418 attached thereto may be used as a conventional lollipop stick should a user prefer to consume the lollipop without attaching it to a beverage bottle.

The straw, cap, and lollipop device of the present invention allows a consumer to simultaneously enjoy and taste the flavors of an edible candy and a liquid beverage, when the lollipop is in the mouth while drawing fluid through the drinking straw immersed in the beverage. As the lollipop dissolves, it mixes with the liquid beverage in the mouth, and the mixture forms a new combined flavor that enhances both the flavor of the lollipop and beverage.

It will be appreciated that the candy component of the device may also be made of other candy such as milk chocolate and consumed in combination with a liquid dairy milk beverage using the straw. There is no limit as to the flavors of the lollipop and beverage which may be combined. The combination straw, cap and lollipop, may be sold in combination with a pre-filled beverage container or it may be sold as a separate unit which may be attached to any type of commercially available beverage.

It will be further appreciated that, the straw, the cap and the lollipop combination may take many different shapes sizes colors or flavors. While various preferred embodiments have been shown and described, it will be understood that there is no intent to limit the invention by such disclosure, but rather, is intended to cover all modifications and alternate constructions falling within the spirit and scope of the invention as to find in the appended claims.

What is claimed is:

1. A novelty device for use with either a threaded mouth beverage bottle or by itself as a lollipop on a stick, said device comprising:

in combination, a hollow conduit drinking straw having an opening at both ends, a bottle cap and an edible hard candy in the form of a lollipop that is dissolvable in the mouth of a consumer;

said straw comprising an upper first portion and a lower remaining second portion;

said lollipop being molded around and affixed to the outer surface of said first portion of said straw such that said straw extends through a center of the lollipop and the opening in the straw adjacent said first portion is exposed permitting entrainment of liquid therethrough and said lower remaining second portion of said straw is exposed;

said cap comprising an upper surface and an annular sleeve extending downwardly from the upper surface wherein said sleeve has internal threads that are compatible to said threads on said bottle such that said cap is capable of being threadedly closed onto said bottle; said cap further comprising a hole in the center of said cap and said cap is connected to said straw through said hole with said lollipop being supported by said cap and a lowermost portion of said lollipop being in contact with said upper surface of said cap; said cap being slidably and removably connectable onto said straw through said hole in said cap and further including a resilient gasket associated with said hole which provides a liquid tight seal around said straw;

said first and second portions of said straw, said cap and said lollipop being dimensioned and oriented relative to each other such that said cap, with said sleeve in its downwardly extending position, can be screwed down onto said bottle such that said exposed second portion of said straw extends into said bottle sufficient to draw liquid from said bottle and through the straw into a consumer's mouth thus giving the consumer the flavor of both the beverage and said lollipop and such that said cap can also be removed from said straw, inverted with said sleeve facing upwardly, and then said inverted cap can be slidably connected back onto said straw a sufficient distance toward said lollipop to leave a sufficient portion of said second portion of said straw below said cap as a handle of sufficient size for the consumer to hand hold said sufficient portion to employ the combination as a lollipop on a stick with the inverted cap acting as a drip catcher for the lollipop;

said straw further including a discontinuous surface to facilitate attachment of said lollipop to said straw.

\* \* \* \* \*